US005695733A

United States Patent [19]
Kroc et al.

[11] Patent Number: 5,695,733
[45] Date of Patent: Dec. 9, 1997

[54] CLUSTERED PRECIPITATED CALCIUM CARBONATE PARTICLES

[75] Inventors: Vicki J. Kroc, Nazareth; George H. Fairchild, Bethlehem, both of Pa.

[73] Assignee: Minerals Technologies Inc., New York, N.Y.

[21] Appl. No.: 674,710

[22] Filed: Jul. 1, 1996

Related U.S. Application Data

[63] Continuation of Ser. No. 449,612, May 24, 1995, abandoned, which is a continuation of Ser. No. 218,045, Jun. 22, 1994, abandoned, which is a continuation of Ser. No. 863,276, Apr. 3, 1992, abandoned.

[51] Int. Cl.$^6$ .................................................. C01F 11/18
[52] U.S. Cl. ................................................................ 423/432
[58] Field of Search ...................... 162/181.2; 423/430, 423/432, 165, 266; 106/464

[56] References Cited

U.S. PATENT DOCUMENTS

| | | | |
|---|---|---|---|
| 2,538,802 | 1/1951 | Schur et al. | 423/432 |
| 3,120,426 | 2/1964 | Crawford | 23/66 |
| 3,126,253 | 3/1964 | Podschus | 23/66 |
| 3,320,026 | 5/1967 | Waldeck | 423/432 |
| 3,627,480 | 12/1971 | Birschall | 23/66 |
| 4,244,933 | 1/1981 | Shibazaki et al. | 423/430 |
| 4,714,603 | 12/1987 | Vanderheiden | 423/432 |
| 4,762,588 | 8/1988 | Hirano et al. | 156/623 R |
| 4,857,291 | 8/1989 | Ota et al. | 423/430 |
| 4,888,160 | 12/1989 | Kosin et al. | 423/432 |
| 5,007,964 | 4/1991 | Tsukisaka et al. | 106/464 |
| 5,043,017 | 8/1991 | Passaretti | 106/465 |
| 5,262,006 | 11/1993 | Andersson et al. | 162/181.2 |

FOREIGN PATENT DOCUMENTS

| | | |
|---|---|---|
| 64-18911 | 1/1989 | Japan . |
| 2-50890 | 2/1990 | Japan . |
| 2-55370 | 11/1990 | Japan . |
| 2145074 | 3/1985 | United Kingdom . |

OTHER PUBLICATIONS

Yamada—Journal of the Pulp and Paper Technoloty Society, vol. 44, No. 1 (Jan. 1990), pp. 62–69.

Yamada et al.—Government Industrial Research Institute, Kyushu, AIT, MITI (Nov. 1983).

Yamada et al.—Gypsum and Lime No. 203 (1986), pp. 221–228.

Yamada et al.—Government Industrial Research Institute, Kyushu (1988).

Yamada, "Synthesis of Flat Basic Calcium Carbonate and Its Use as a Paper Coating Pigment", *Kami Parapu Taimsu*, No. 7, pp. 29–32 (Kyushu Industrial Engineering Testing Institute 1988).

*Primary Examiner*—Michael Lewis
*Assistant Examiner*—Stuart L. Hendrickson
*Attorney, Agent, or Firm*—Marvin J. Powell; Terry B. Morris

[57] ABSTRACT

Novel precipitated calcium carbonate particles in clustered form, which when used as fillers impart improved strength, opacity and other advantages to paper, are prepared by a process involving adding lime and carbon dioxide to a reaction mixture containing seed material having a scalenohedral morphology, the lime and carbon dioxide being added simultaneously. The flow rates of the lime and carbon dioxide are adjusted to control the solution conductivity of the reaction minute to between about 2.0 and about 4.0 mS to form the clusters of calcite particles, the clusters having an average equivalent spherical diameter of between about 1.5 and 3.5 microns and a specific surface area of between about 2.0 and 9.0 m$^2$/g. At least about 25% of the particles of said clusters have a prismatic form.

9 Claims, 5 Drawing Sheets

CLUSTERED PRECIPITATED CALCIUM CARBONATE PARTICLES

This is a continuation of abandoned application Ser. No. 08/449,612, filed 24 May 1995, now abandoned, which is a continuation of abandoned application Ser. No. 08/218,045 filed 22 Jun. 1994, now abandoned, which is a continuation of abandoned application Ser. No. 07/863,276, fled 03 April 1992, now abandoned.

This invention relates to novel precipitated calcium carbonate particles in clustered form, a substantial proportion of said particles having a prismatic morphology, and to a method for their preparation.

Calcium carbonate particles of varying sizes and shapes are among the most useful fillers in the paper-making art. These particles may be roughly divided into two groups, to wit: natural calcium carbonate particles, and precipitated calcium carbonate particles. Natural calcium carbonate is prepared by mechanically grinding limestone to particle sizes as small as 0.5 microns, although grinding limestone below one micron is exceedingly difficult. As a general rule, ground limestone particles are usually very irregular in shape, and ordinarily exhibit a broad particle size distribution.

General methods for production of precipitated calcium carbonates are concerned with the slaking of lime (calcium oxide), temperature of carbonation, and rate of introduction of carbon dioxide into the slaked lime. By appropriately controlling the solution environment, either calcite, aragonite, or vaterite is produced. Depending on the conditions of the environment, calcite can have either a prismatic, scalenohedral or rhombohedral crystal habit. Aragonite is acicular and takes the form of either single or clustered needles. Vaterite is generally spherical but is unstable and converts readily to calcite. The crystal morphologies of the products are determined by the concentration of calcium and hydroxyl ion in the specific solution environment during the nucleation and growth of calcium carbonate.

Size control by varying slake and carbonation conditions is generally related closely to the resultant morphology and is usually limited to a relatively narrow range for each product.

Morphology and size are also often significantly influenced by addition of various additives to slaked limes. This is illustrated by U.S. Pat. No. 4,714,603 in which a synthesis for the preparation of spherical calcite particles is described wherein a dissolved polyphosphate is added to slaked lime prior to the introduction of carbon dioxide. Particle sizes of between 2.5 and 10.0 microns are disclosed with the size depending upon the quantity of polyphosphate added.

Other additives such as polybasic organic acids and polysaccharides have also been found to exert some size control when they are added to lime prior to carbonation, the effect being dependent on the source, age and purity of the lime used.

Japanese Kokai No. 90-30,614 discloses a process for making cubic calcium carbonate powder by purging a milk of lime slurry at 5°–20° C. with a gas containing 10–40 volume percent $CO_2$, followed by filtering and dewatering of the precipitate. The solution from filtration and dewatering is then reused in the process.

U.S. Pat. No. 4,367,207 (Vanderheiden) discloses a process for preparing a finely divided precipitated calcite by adding an organopolyphosphonate polyelectrolyte to a milk of lime slurry, followed by addition of carbon dioxide gas to the slurry at a starting temperature of between 7° C. and 18° C. The resulting finely divided precipitated calcite has an average particle size of less than about 0.03 micron.

An acid-stabilized form of calcium carbonate is disclosed in U.S. Pat. No. 5,043,017 (Passaretti), comprised of a mixture containing finely divided calcium carbonate to which is added a calcium-chelating agent and a conjugate base, followed by the addition of a weak acid, such as phosphoric acid.

Katayama, et al., European Published Patent Application EP 406,662 discloses a process for producing calcium carbonate of aragonite crystal form by premixing aragonite crystal calcium carbonate and $Ca(OH)_2$ to prepare an aqueous slurry, adding a water soluble phosphoric acid compound into the aqueous slurry, and introducing $CO_2$ gas into the aqueous slurry to cause carbonation to take place. The resulting aragonite crystal form calcium carbonate is of large particle size and acicular in shape, having a long diameter of 10 to 100 microns, and a short diameter of 0.5 to 4.0 microns.

Japanese Kokai No. 89-301,510 describes the preparation of a spindle shaped calcium carbonate by addition of polysaccharides, $H_2SO_4$ and/or its salts during carbonation of a milk of lime slurry.

U.S. Pat. No. 3,320,026 to Waldeck, discloses a process for preparing discrete stubby prismatic calcite calcium carbonate which comprises carbonating a milk of lime slurry at a starting temperature of less than 20° C. until calcite crystallization is commenced, and then allowing the temperature of the reaction mixture to rise to between about 30° and 45° C.

U.K. Patent Application 2145074A (Shiraishi) discloses a process for preparing needle to pillar-like aragonite particles which are irregular and three-dimensionally twined about one another. The average length of the aragonite particles is between 0.3 and 6 microns. The process uses a seed of aragonite crystals to which is added $Ca(OH)_2$ slurry and $CO_2$ containing gas.

As stated, calcium carbonate and in particular precipitated calcium carbonate (PCC) has wide application in the paper making art as a filler, the use of such fillers being critical from the aspect of cost. In this regard, wood pulp is much more expensive than filler materials; thus the more filler the paper manufacturers can employ the lower is the cost of the finished product. PCC has some further advantages as well. It tends to increase the life of a paper product because the use of acid is usually avoided when PCC is employed. It also tends to make paper more opaque, which is usually desirable, i.e. the less light that will pass through paper, usually the better the commercial suitability of the product.

However, the use of filler materials such as PCC also presents a severe drawback which is that the strength of paper decreases in direct proportion to the amount of filler employed. Thus the paper-making industry is in a constant search for new filler materials which will balance the cost-saving aspect of using filler materials e.g. PCC, with the strength-weakening effect of the same. It has been found that by increasing the particle size of the PCC filler material, this defect is somewhat offset; the strength of the paper increases in virtually direct proportion to the size of the particles of the filler material. However, this desirable effect is then counterbalanced by a concomitant loss of opacity in the paper, again in almost direct proportion to the size of the particles used. Thus, the need for improved PCC fillers which will effect a better balance between minimizing the loss of strength in the paper to which the filler is added while retaining excellent optical values remains a prime concern of the paper industry.

SUMMARY OF THE INVENTION

In accordance with this invention, novel precipitated calcium carbonate particles of a unique habit (and a defined average equivalent spherical diameter size) have been made which will effect improved properties in a paper to which they are added as a filler, such properties including an improved balance between strength and opacity.

More particularly, the novel PCC particles of this invention are in the form of clusters or aggregates of calcite particles, in which a substantial proportion of said particles, on the order of at least about 25 percent (by total particle count or number) but preferably more than 50%, have a prismatic morphology, the clusters also being further characterized by an average equivalent spherical diameter of between about 1.5 and about 3.5 microns, and a specific surface area of between about 2.0 and about 9.0 $m^2/g$.

It has been found that the aforesaid clustered PCC particles of this invention can be made by a controlled two-step process. In its broadest context, this process entails a first step of forming a reaction mixture containing a seed material composed of scalenohedral particles of PCC having an average spherical diameter of between about 1.0 and about 1.8 microns. As a second step, a further amount of lime (calcium hydroxide or calcium oxide) is introduced, essentially simultaneously, with carbon dioxide into the reaction mixture containing the aforesaid seed material. The flow rates of the added lime and carbon dioxide are adjusted so as to control the solution conductivity of the resulting reaction mixture to between about 2.0 and about 4.0 mS. The formation of the unique clusters of PCC particles having the aforesaid proportion of prismatic morphology according to this invention was unexpected, as were the surprising properties of these clusters when employed as fillers in the paper-making process.

This invention accordingly also contemplates improved paper products having incorporated therein the novel clustered PCC particles of this invention, which are characterized by high strength and desirable opacity, and which include further unexpected advantages such as reduced costs over other high strength fillers since the subject process requires virtually no cooling or no additional production equipment.

DETAILED DESCRIPTION OF THE INVENTION

Figure 6:
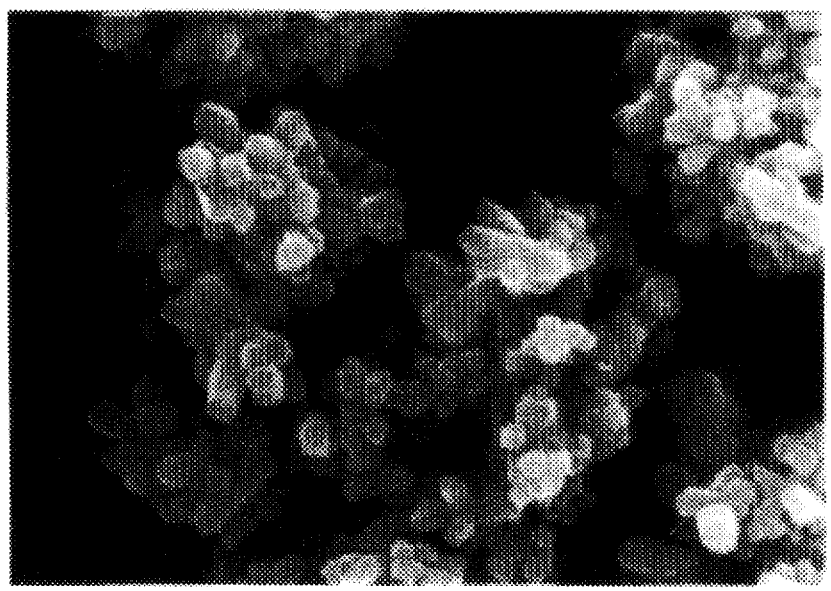
FIG. 6 is a photomicrograph, taken at a magnification of 10,000×, indicating the morphology of a typical clustered prismatic PCC of this invention.

As stated heretofore, the novel PCC particles of this invention are bound together in a clustered configuration or pattern. This is indicated in FIG. 6 which will be referred to again hereinafter. As shown in the photomicrograph of this figure, the particles of PCC are bound together in a cluster or aggregate and are not discrete in nature. A critical aspect of this configuration or pattern is that a substantial portion of the bonded particles are prismatic in morphology. In the practice of this invention, a "substantial portion" denotes a percentage on the order of at least about 25%. However, it is preferable in order to achieve the best balance between paper strength and opacity, that the percentage of prismatic particles in the cluster or aggregate be about 50% or greater.

It has also been found that the average equivalent spherical diameters (hereinafter termed AESD) of the clusters of this invention are between about 1.5 and about 3.5 microns and have a specific surface area of between about 2.0 and about 9.0 $m^2/g$. Clusters having an AESD of about 2.0 to about 2.6, and a surface area of about 3 to about 6 $m^2/g$ are particularly desirable in commercial applications.

The aforesaid novel PCC particles of this invention can be prepared by a process which comprises a first step of forming a reaction mixture containing a seed material composed of discrete scalenohedral PCC particles having an AESD of between about 1.0 and about 1.8 microns. While any method known in the art could be employed to produce such particles with the aforesaid AESD, it has been found preferable to form such particles by introducing carbon dioxide into an aqueous slurry of calcium hydroxide, the introduction of the carbon dioxide being initially started at a temperature of between about 20° C. and about 50° C., a temperature range of between 30° C. and 50° C. being particularly suitable.

Step two of the process for making the PCC particles of this invention comprises adding an additional amount of lime at essentially the same time as a flow of carbon dioxide, i.e. essentially simultaneously, to the reaction mixture of step one containing the scalenohedral seed material. A further critical feature of this step is that the flow rates of the added lime and carbon dioxide are adjusted so as to control the solution conductivity of the ensuing reaction mixture to between about 2.0 and about 4.0 mS; a solution conductivity of between about 2.5 to about 3.5 mS being preferred and most preferably about 3.0 mS.

In this second step, the temperature of the reaction mixture is not critical and can be determined empirically, i.e. by the growth and formation of the clustered PCC particles of this invention with the aforesaid particle morphology, cluster AESD and surface area values. It has been found that temperatures of between about 40° C. and 70° C. are typical ranges for carrying out the second step of this process.

In the second step, the added lime can also come from a variety of sources, such as (a) a portion of the batch of the aqueous slurry of calcium hydroxide not used in the aforesaid first step, (b) from another source of aqueous slurry other than that used in the first step, and (c) "dry lime" such as pebble or granular quicklime (CaO) produced by the calcination of limestone. The use of dry lime is not as preferred as an aqueous slurry of lime because most existing commercial processes for making PCC employ the use of aqueous lime slurries in the carbonation step. However, it could be advantageous in situations where it is desirable to minimize use of water in the PCC slurry, e.g. when increasing the PCC solids in the slurry is desired.

Parenthetically, it should be noted that it was unexpected that clustered PCC particles would be formed at the end of the second step; it had been thought that only larger discrete scalenohedral particles would be formed or grown under the process conditions of the aforesaid second step.

It should also be noted that while it is critical that at least a "substantial portion" of the particles bound together in the clusters or aggregates of this invention be prismatic in morphology, the morphology of the remaining particles bound to said clusters or aggregates can be rhombohedral or scalenohedral in morphology. As indicated previously, a "substantial portion" in the context of this invention denotes at least about 25% (determined by total particle count or number). Below 25%, the product formed will perform in substantially the same manner as a scalenohedral PCC having essentially the same AESD.

It is also desirable that both the first and second steps of this invention be carried out under agitation in order to increase the efficiency of the interaction between the reactive components of the reaction mixture.

There are some additional variables that are present in all known processes for the preparation of PCC particles, which can have some effect on the shape and size of the particles produced. However, in the practice of this invention, these variables are not critical and can be adjusted empirically. For example, the characteristics of lime may vary according to source; such variances between limes can impact somewhat upon the size of particles of PCC.

If an aqueous slurry of calcium hydroxide is to be used in the aforesaid first step of the subject process, it is useful to remove unslaked lime and other impurities from said slurry before introduction into the reactor. About 30 to about 80% of this screened slurry can then be employed in the seed producing first step; the remainder of the screened slurry can then be added in the second step of the subject process. In a usual procedure, gaseous carbon dioxide is then bubbled into the aforesaid screened slurry of the first step at a controlled rate until the conductivity of the reaction mixture minimizes (i.e. reaches a minimum), and a pH of between 7.0 and 8.5 is reached. In the second step of the subject process, a flow of gaseous carbon dioxide is introduced simultaneously with the balance of screened aqueous slurry, and the flow of gaseous carbon dioxide is typically then continued until the solution conductivity of the reaction mixture of the second or growth step minimizes and a pH of between 7 and 8 is reached.

While the use of gaseous carbon dioxide is most typical in the subject process, other forms of carbon dioxide, such as liquid or solid carbon dioxide or combinations thereof, can be used in either step one or step two of the subject process.

As was stated previously, there are numerous incentives for increasing the amount (termed loading level) of filler material in paper. These incentives include:

(a) raw material cost savings. (Fiber costs are substantially higher than are filler costs);

(b) energy costs savings. (The addition of filler means there will be less pulp to refine per ton of paper);

(c) steam consumption which is another aspect of energy costs. (Steam consumption decreases as the filler level increases so that the energy required to dry the paper decreases);

(d) improved optical properties. (Opacity and brightness increase with increasing amounts of PCC.)

However, there are concomitant drawbacks in using filler materials such as PCC in the manufacture of paper. These drawbacks have to be factored into any paper-making equation which entails increasing the percentage of such filler materials: These drawbacks include:

(a) loss of strength
(b) loss of stiffness
(c) loss of sizing - (This can be defined as the loss of resistance to the penetration by liquids of the finished paper product).

As stated heretofore, increasing the particle size of filler, in the present context PCC, will improve certain properties of paper, e.g. strength, stiffness and sizing, adversely affected by an increase in the amount of filler "loaded" into the paper. However, this must then be balanced against the loss in opacity which occurs when PCC particle size is increased.

The novel PCC particles of this invention effect a "balance" between the aforesaid advantages and disadvantages and enable the use of relatively large particle size "clusters," at high filler levels, which translates into a considerable commercial improvement over PCC fillers presently employed in the paper making art. This can be seen by reference to FIGS. 1–3 which represent the results of handsheet studies more fully described hereinafter.

Figure 1:
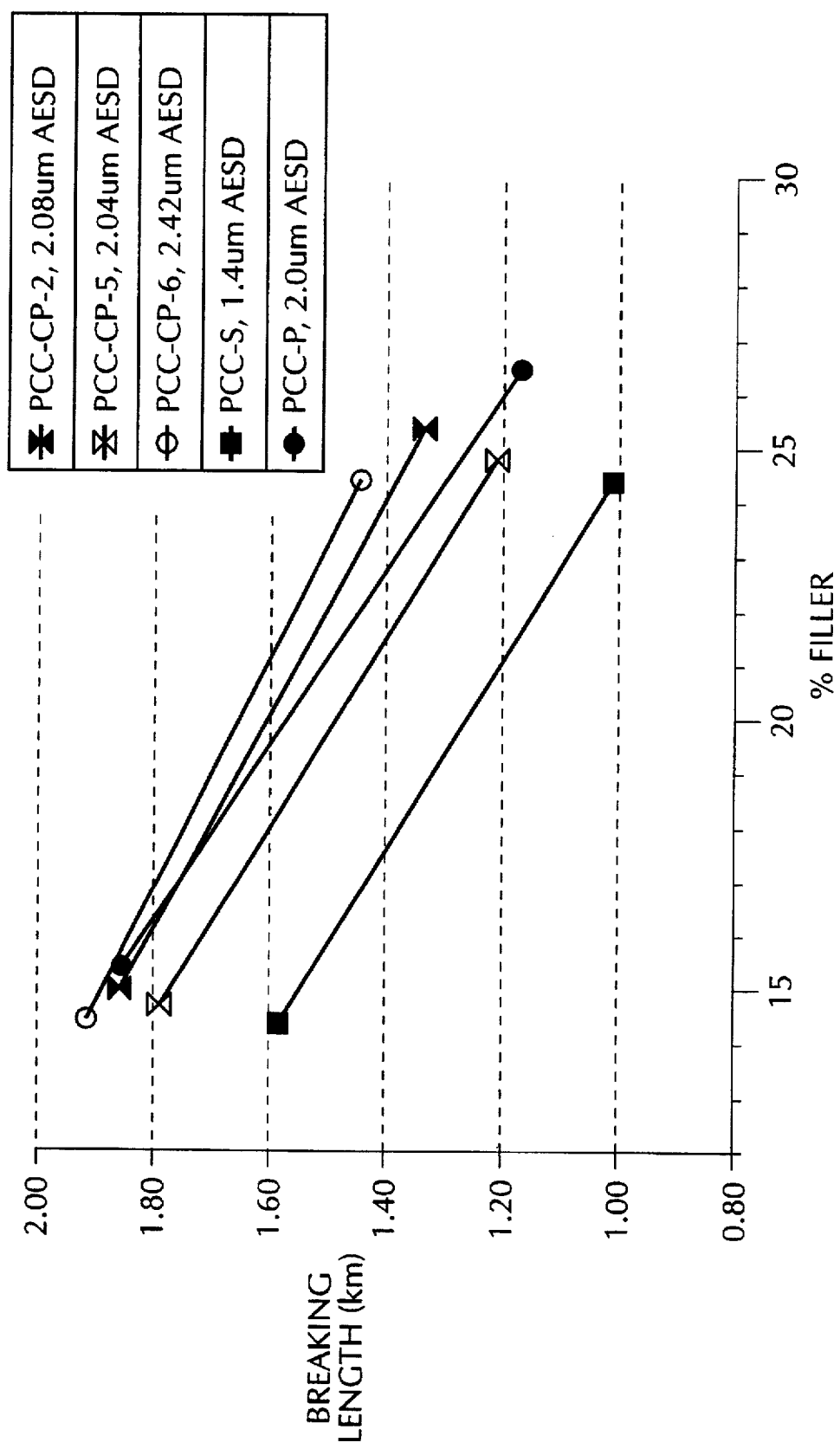
FIG. 1 is a graph comparing the effect on the strength of paper impregnated with three representative products of this invention, designated PCC-CP-2, PCC-CP-5, and PCC-CP-6 respectively, with that of paper impregnated with a scalenohedral PCC, designated PCC-S, and a discrete prismatic PCC, designated PCC-P.

In FIG. 1 the representative examples of the PCC particles of this invention, designated for convenience PCC-CP-2, PCC-CP-5, and PCC-CP-6 are contrasted from the aspect of tensile strength, as measured by breaking length, with a known PCC filler material having a scalenohedral morphology and an AESD of about 1.4 microns, designated for convenience "PCC-S," and another known PCC filler material having a discrete prismatic morphology and an AESD of about 2.0 microns, designated for convenience "PCC-P." The PCC-CP-2, PCC-CP-5, and PCC-CP-6 products of this invention have AESD of 2.08 microns, 2.04 microns and 2.42 microns, respectively.

It should also be noted that the material "PCC-S" is representative of a type of filler marketed by Pfizer Specialty Minerals Inc. under the trademark ALBACAR HO, and is a filler material characterized by imparting high opacity to paper. The material "PCC-P" is representative of a type of filler also marketed by Pfizer Specialty Minerals Inc. under the trademark ALBAFIL XL and is a filler characterized by imparting high strength to paper, when compared to other fillers, even when employed in high (loading) percentages. The micron sizes for the PCC-S (about 1.4) and PCC-P (about 2.0) are typical for commercial applications of these filler materials.

It can be seen from FIG. 1 that the PCC particles of this invention provide tensile strength properties not appreciably different from that of the high strength filler PCC-P. It is also to be noted that the filler materials encompassed by this invention can be employed in percentage levels 5–7 points higher than the high opacity filler PCC-S, while, at these elevated levels, still achieving equivalent tensile strength as the PCC-S at lower levels of "loading."

Figure 2:
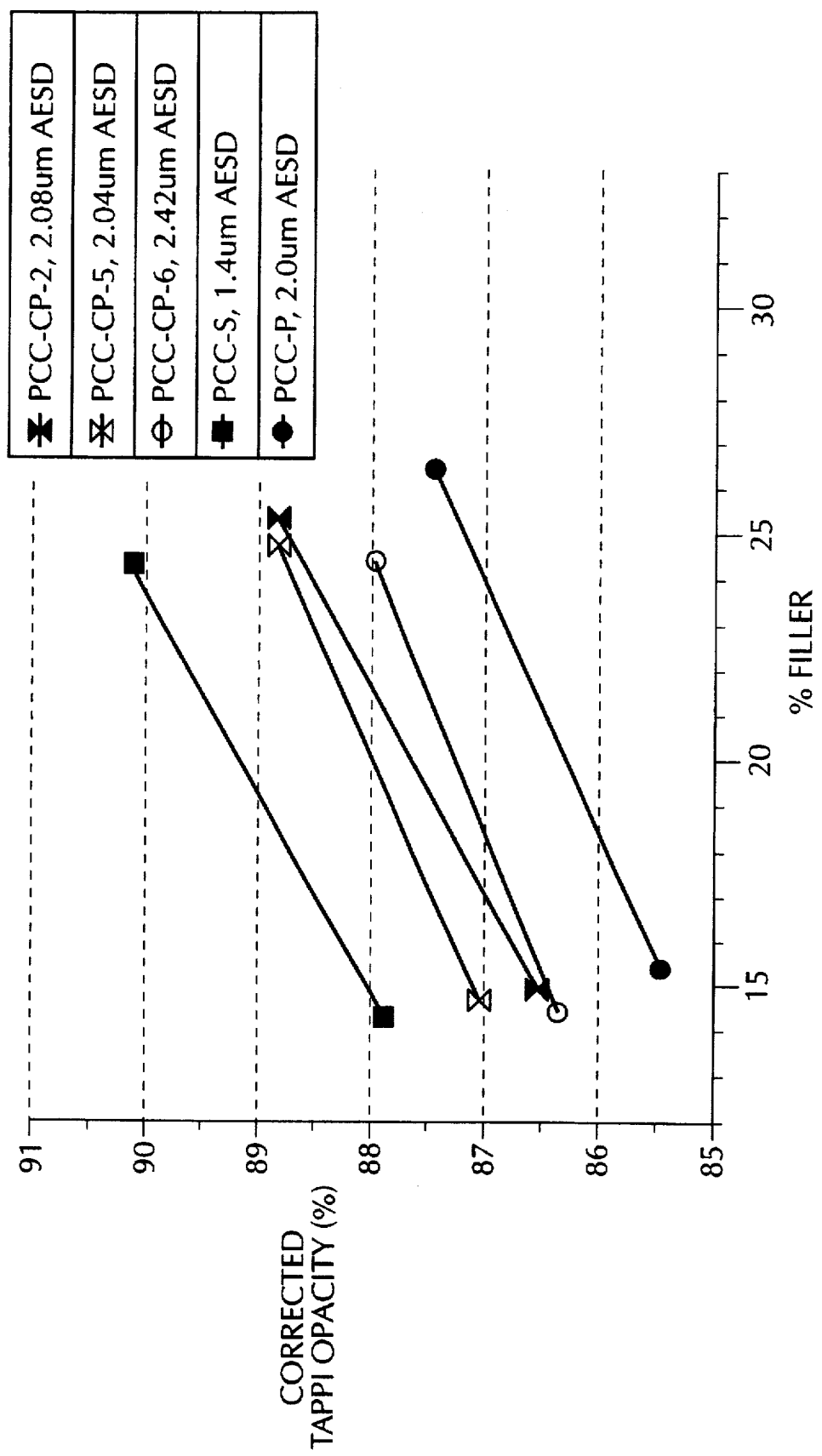
FIG. 2 is a graph comparing the effect on the opacity of paper impregnated with the three representative products of this invention indicated in FIG. 1, with that of paper impregnated with the PCC-S and PCC-P of FIG. 1.

In FIG. 2, it can be seen that the novel PCC materials of this invention impart substantially higher opacity to paper than does the PCC-P filler. Thus, the balance sought is achieved, i.e. good opacity and excellent strength imparting properties.

Figure 3:
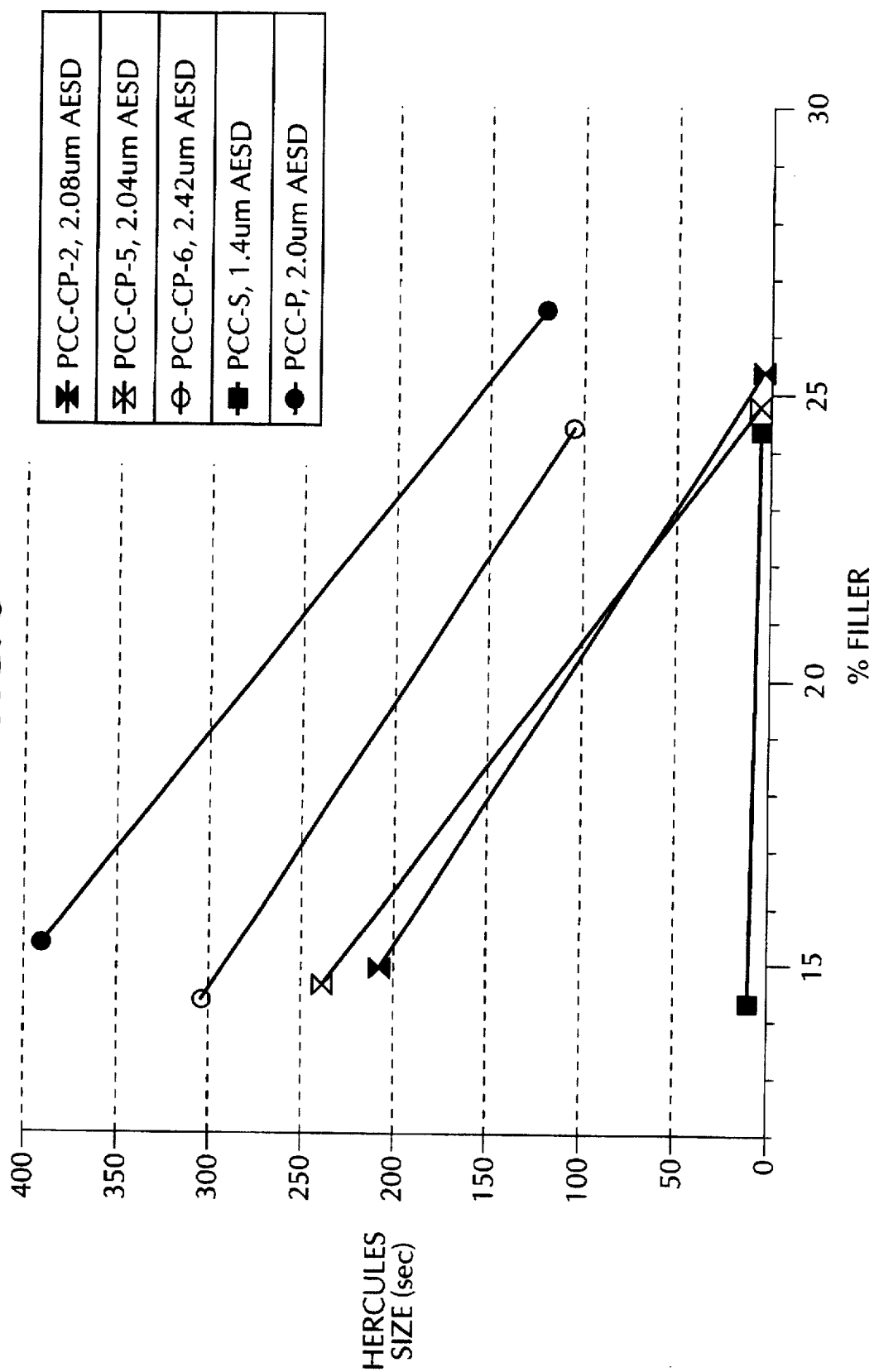
FIG. 3 is a graph comparing the effect on the sizing of paper impregnated with the three representative products of this invention indicated in FIG. 1, with that of paper impregnated with the PCC-S and PCC-P of FIG. 1.

In FIG. 3, it can be seen that the novel PCC material of this invention impart far greater sizing advantages to paper than does the high opacity filler PCC-S. Again, this further illustrates the overall favorable balance of properties inherent in the novel materials of this invention.

In the context of these figures, "Hercules size" in FIG. 3 denotes the resistance of paper to permeation of an aqueous penetrant. During a typical test, a green ink is applied to the surface of a piece of paper, and the time to penetrate to the underside of the paper is measured.

In FIG. 2, the test employed was developed by Technical Association of the Pulp and Paper Industry (TAPPI) to measure opacity.

Figure 4:
FIG. 4 is photomicrograph, taken at a magnification of 10,000×, indicating the morphology of the PCC-S of FIGS. 1-3.
Figure 5:
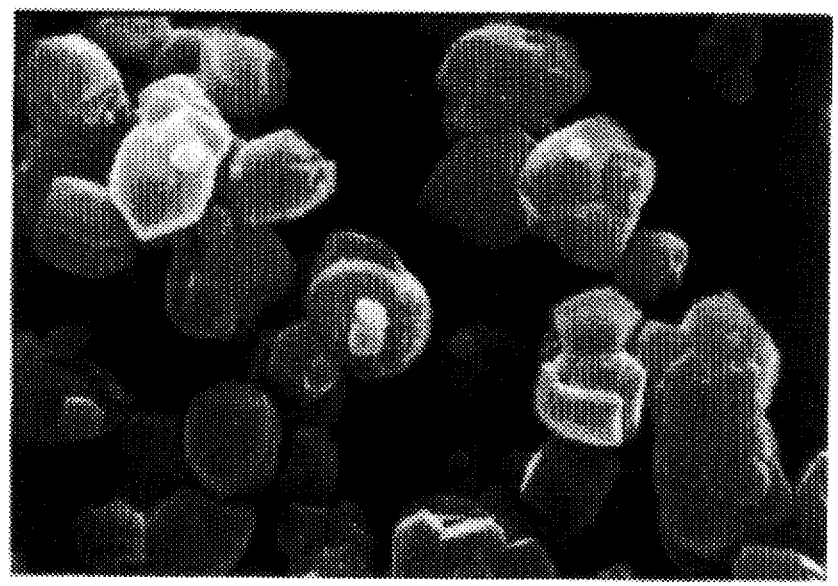
FIG. 5 is a photomicrograph, taken at a magnification of 10,000×, indicating the morphology of the PCC-P of FIGS. 1-3.

The morphological structure of the PCC-S filler material referred to above is shown in the microphotograph of FIG. 4. The morphological structure of the PCC-P filler material referred to above is shown in the microphotograph of FIG. 5. A typical morphological structure of the PCC particles of this invention is shown in the microphotograph of FIG. 6. The cluster or aggregate configuration of the PCC particles of this invention, and the prismatic morphology of particles bonded in this configuration can be clearly seen.

The present invention will now be described in more detail by way of examples and by reference, where applicable, to the drawings. The examples are illustrative and are not to be construed as limiting the invention.

EXAMPLE 1

SEED PHASE:

Into a 4-liter stainless steel reactor equipped with a stirrer, a gas injection tube and a liquid injection tube there was introduced 1.10 liters of a 7.6 weight percent milk-of-lime ($Ca(OH)_2$) slurry. The temperature of the $Ca(OH)_2$ slurry was adjusted to 45° C. Vigorous agitation was commenced and a 15% $CO_2$, 85% air gas mixture was introduced at a rate of 5.6 liters/minute to effect carbonation of the $Ca(OH)_2$. Carbonation continued until the pH of the slurry became 7.5 indicating the reaction was substantially complete. The time of carbonation was 32 minutes and the final temperature of the seeding material was 50° C. Using electron microscopy it was determined that the resulting product was a $CaCO_3$ having a scalenohedral morphology with an AESD of 1.33 microns.

GROWTH PHASE:

The growth phase was conducted in the same stainless steel reactor as described above by the introduction of further amounts of $Ca(OH)_2$ while agitating the seed and introducing a 15% $CO_2$, 85% air mixture into the reactor. The $Ca(OH)_2$ slurry concentration was 7.6% by weight and was added at a rate of 34 ml/minute while the $CO_2$/air gas mixture was added at a rate of 5.5 liters/minute. The rate of $Ca(OH)_2$ addition is controlled to keep the slurry conductivity constant at about 3 mS. The growth phase continued for 39 minutes until such time as the desired amount of $Ca(OH)_2$ had been added and the desired amount of growth of the seeding material obtained. The final slurry temperature was 44° C. The resulting cluster had an AESD of 2.65 microns and via electron microscopy was determined to be about 90 percent converted to the prismatic morphology. It also had a specific surface area of 5.0 $m^2/g$.

EXAMPLE 2

SEED PHASE:

Into a 4-liter stainless steel reactor equipped with a stirrer, a gas injection tube and a liquid injection tube there was introduced 0.9 liters of a 15.1 weight percent milk-of-lime ($Ca(OH)_2$) slurry. The temperature of the $Ca(OH)_2$ slurry was adjusted to 45° C. Vigorous agitation was commenced and a 100% $CO_2$, 0% air gas mixture was introduced at a rate of 1.7 liters/minute to effect carbonation of the $Ca(OH)_2$. Carbonation continued until the pH of the slurry became 8.0 indicating the reaction was substantially complete. The time of carbonation was 40 minutes and the final temperature of the seeding material was 76° C. Using electron microscopy it was determined that the resulting product was a $CaCO_3$ having a scalenohedral morphology with an AESD of 1.31 microns.

GROWTH PHASE:

The growth phase was conducted in the same stainless steel reactor as described above by the introduction of further amounts of $Ca(OH)_2$ while agitating the seed and introducing a 100% $CO_2$, 0% air mixture into the reactor. The $Ca(OH)_2$ slurry concentration was 15.1% by weight and was added at a rate of 25 ml/minute while the $CO_2$/air gas mixture was added at a rate of 1.7 liters/minute. The rate of $Ca(OH)_2$ addition is controlled to keep the slurry conductivity constant at about 3 mS. The growth phase continued for 29 minutes until such time as the desired amount of $Ca(OH)_2$ had been added and the desired amount of growth of the seeding material obtained. The final slurry temperature was 71° C. The resulting cluster had an AESD of 2.08 microns and via electron microscopy was determined to be about 85 percent converted to the prismatic morphology. It also had a specific surface area of 6.6 $m^2/g$. The product of this example is represented in FIGS. 1–3 as PCC-CP-2.

EXAMPLE 3

SEED PHASE:

Into a 4-liter stainless steel reactor equipped with a stirrer, a gas injection tube and a liquid injection tube there was introduced 1.1 liters of a 15.5 weight percent milk-of-lime ($Ca(OH)_2$) slurry. The temperature of the $Ca(OH)_2$ slurry was adjusted to 42° C. Vigorous agitation was commenced and a 10% $CO_2$, 90% air gas mixture was introduced at a rate of 6.4 liters/minute to effect carbonation of the $Ca(OH)_2$. Carbonation continued until the pH of the slurry began to descend indicating the reaction was almost complete. The time of carbonation was 96 minutes and the final temperature of the seeding material was 60° C. Using electron microscopy it was determined that the resulting product was a $CaCO_3$ having a scalenohedral morphology with an AESD of 1.62 microns.

GROWTH PHASE:

The growth phase was conducted in the same stainless steel reactor as described above by the introduction of further amounts of $Ca(OH)_2$ while agitating the seed and introducing a 10% $CO_2$, 90% air mixture into the reactor. The $Ca(OH)_2$ slurry concentration was 15.5% by weight and was added at a rate of 9 ml/minute while the $CO_2$/air gas mixture was added at a rate of 6.4 liters/minute. The rate of $Ca(OH)_2$ addition is controlled to keep the slurry conductivity constant at about 3 mS. The growth phase continued for 120 minutes until such time as the desired amount of $Ca(OH)_2$ had been added and effected the desired amount of growth of the seeding material obtained. The final slurry temperature was 45° C. The resulting cluster had an AESD size of 2.41 microns and via electron microscopy was determined to be about 80 percent converted to the prismatic morphology. It also had a specific surface area of 3.9 $m^2/g$. This example indicated that the formation of seed material need not be complete before the growth stage is initiated.

EXAMPLE 4

SEED PHASE:

Into a 4-liter stainless steel reactor equipped with a stirrer, a gas injection tube and a liquid injection tube there was introduced 1.1 liters of a 15.5 weight percent milk-of-lime ($Ca(OH)_2$) slurry. The temperature of the $Ca(OH)_2$ slurry was adjusted to 34° C. Vigorous agitation was commenced and a 30% $CO_2$, 70% air gas mixture was introduced at a rate of 8.5 liters/minute to effect carbonation of the $Ca(OH)_2$. Carbonation continued until the pH of the slurry became 7.7 indicating the reaction was substantially complete. The time of carbonation was 64 minutes and the final temperature of the seeding material was 44° C. Using electron microscopy it was determined that the resulting product was a CaCO$_3$ having a scalenohedral morphology with an AESD of 1.56 microns.

GROWTH PHASE:

The growth phase was conducted in the same stainless steel reactor as described above by the introduction of further amounts of Ca(OH)$_2$ while agitating the seed and introducing a 30% CO$_2$, 70% air mixture into the reactor. The Ca(OH)$_2$ slurry concentration was 15.5% by weight and was added at a rate of 37 ml/minute while the CO$_2$/air gas mixture was added at a rate of 7.3 liters/minute. The rate of Ca(OH)$_2$ addition is controlled to keep the slurry conductivity constant at about 3 mS. The growth phase continued for 31 minutes until such time as the desired amount of Ca(OH)$_2$ had been added and effected the desired amount of growth of the seeding material obtained. The final slurry temperature was 51° C. The resulting cluster had an AESD of 2.33 microns and via electron microscopy was determined to be about 60 percent converted to the prismatic morphology. It also had a specific surface area of 5.1 m$^2$/g.

EXAMPLE 5

SEED PHASE:

Into a 4-liter stainless steel reactor equipped with a stirrer, a gas injection tube and a liquid injection tube there was introduced 1.6 liters of a 13.5 weight percent milk-of-lime (Ca(OH)$_2$) slurry. The temperature of the Ca(OH)$_2$ slurry was adjusted to 44° C. Vigorous agitation was commenced and a 15% CO$_2$, 85% air gas mixture was introduced at a rate of 7.3 liters/minute to effect carbonation of the Ca(OH)$_2$. Carbonation continued until the pH of the slurry became 7.5 indicating the reaction was substantially complete. The time of carbonation was 90 minutes and the final temperature of the seeding material was 52° C. Using electron microscopy it was determined that the resulting product was a CaCO$_3$ having a scalenohedral morphology with an AESD of 1.67 microns.

GROWTH PHASE:

The growth phase was conducted in the same stainless steel reactor as described above by the introduction of further amounts of Ca(OH)$_2$ while agitating the seed and introducing a 15% CO$_2$, 85% air mixture into the reactor. The Ca(OH)$_2$ slurry concentration was 13.5% by weight and was added at a rate of 16 ml/minute while the CO$_2$/air gas mixture was added at a rate of 7.3 liters/minute. The rate of Ca(OH)$_2$ addition is controlled to keep the slurry conductivity constant at about 3 mS. The growth phase continued for 36 minutes until such time that the desired amount of Ca(OH)$_2$ had been added and effected the desired amount of growth of the seeding material. The final slurry temperature was 44° C. The resulting product had an AESD of 2.04 microns and via electron microscopy was determined to be about 30 percent converted to the prismatic morphology. It also had a specific surface area of 6.4 m$^2$/g. The product is represented in FIGS. 1–3 as PCC-CP-5.

EXAMPLE 6

SEED PHASE:

Into a 4-liter stainless steel reactor equipped with a stirrer, a gas injection tube and a liquid injection tube, there was placed 1.3 liters of a 11.7 weight percent milk-of-lime (Ca(OH)$_2$) slurry. The temperature of the Ca(OH)$_2$ slurry was adjusted to 45° C. Vigorous agitation was commenced and a 15% CO$_2$, 85% air gas mixture was introduced at a rate of 6.3 liters/minute to effect carbonation of the Ca(OH)$_2$. Carbonation continued until the pH of the slurry became 7.5 indicating the reaction was substantially complete. The time of carbonation was 79 minutes and the final temperature of the seeding material was 52° C. Using electron microscopy it was determined that the resulting product was a CaCO$_3$ having a scalenohedral morphology with an AESD of 1.69 microns.

GROWTH PHASE:

The growth phase was conducted in the same stainless steel reactor as described above by the introduction of further amounts of Ca(OH)$_2$ while agitating the seed and introducing a 15% CO$_2$, 85% air mixture into the reactor. The Ca(OH)$_2$ slurry concentration was 11.7% by weight and was added at a rate of 14 ml/minute while the CO$_2$/air gas mixture was added at a rate of 6.3 liters/minute. The rate of Ca(OH)$_2$ addition is controlled to keep the slurry conductivity constant at about 3 mS. The growth phase continued for 63 minutes until such time as the desired amount of Ca(OH)$_2$ had been added and the desired amount of growth of the seeding material obtained. The final slurry temperature was 45° C. The resulting cluster or aggregate had an AESD of 2.42 microns and via electron microscopy was determined to be about ~60 percent converted to the prismatic morphology. It also had a specific surface area of 4.5 m$^2$/g. It is represented in FIGS. 1–3 as PCC-CP.-6. The product of this example is typical of the kind used in a commercial plant.

EXAMPLE 7

SEED PHASE:

Into a 4-liter stainless steel reactor equipped with a stirrer, a gas injection tube and a liquid injection tube there was placed 1.1 liters of a 15.3 weight percent milk-of-lime (Ca(OH)$_2$) slurry. The temperature of the Ca(OH)$_2$ slurry was adjusted to 33° C. Vigorous agitation was commenced and a 24% CO$_2$, 76% air gas mixture was introduced at a rate of 6.3 liters/minute to effect carbonation of the Ca(OH)$_2$. Carbonation continued until the pH of the slurry becomes 8 indicating the reaction was substantially complete. The time of carbonation was 120 minutes and the final temperature of the seeding material was 70° C. Using electron microscopy it was determined that the resulting product was a CaCO$_3$ having a scalenohedral morphology with an AESD of 1.16 microns.

GROWTH PHASE:

The growth phase was conducted in the same stainless steel reactor as described above by the introduction of further amounts of Ca(OH)$_2$ while agitating the seed and introducing a 22% CO$_2$, 78% air mixture into the reactor. The Ca(OH)$_2$ slurry concentration was 15.9% by weight and was added at a rate of 13 ml/minute while the CO$_2$/air gas mixture was added at a rate of 7.5 liters/minute. The rate of Ca(OH)$_2$ addition was controlled to keep the slurry conductivity constant at about 3 mS. The growth phase continued for 57 minutes until such time as the desired amount of Ca(OH)$_2$ had been added and the desired amount of growth of the seeding material obtained. The final slurry temperature was 68° C. The resulting product had an AESD of 1.65 microns, a specific surface area of 8.0 m$^2$/g, and via electron microscopy was determined to be about 70 percent converted to the prismatic morphology.

EXAMPLE 8

SEED PHASE:

Into a 4-liter stainless steel reactor equipped with a stirrer, a gas injection tube and a liquid injection tube there was placed 0.9 liters of a 15 weight percent milk-of-lime (Ca(OH)$_2$) slurry. The temperature of the Ca(OH)$_2$ slurry was adjusted to 44° C. Vigorous agitation was commenced and a 100% CO$_2$, 0% air gas mixture was introduced at a rate of 2.1 liters/minute to effect carbonation of the Ca(OH)$_2$. Carbonation continued until the pH of the slurry became 7.5 indicating the reaction was substantially complete. The time of carbonation was 33 minutes and the final temperature of the seeding material was 64° C. Using electron microscopy it was determined that the resulting product was a CaCO$_3$ having a scalenohedral morphology with an AESD of 1.99 microns.

GROWTH PHASE:

The growth phase was conducted in the same stainless steel reactor as described above by the introduction of further amounts of Ca(OH)$_2$ while agitating the seed and introducing a 100% CO$_2$, 0% air mixture into the reactor. The Ca(OH)$_2$ slurry concentration was 15.% by weight and Was added at a rate of 31 ml/minute while the CO$_2$/air gas mixture was added at a rate of 2.1 liters/minute. The rate of Ca(OH)$_2$ addition is controlled to keep the slurry conductivity constant at about 3 mS. The growth phase continued for 34 minutes until such time as the desired amount of Ca(OH)$_2$ had been added and the desired amount of growth of the seeding material obtained. The final slurry temperature was 55° C. The resulting product had an AESD of 3.44 microns, a specific surface area of 5.9 m$^2$/g, and via electron microscopy was determined to be about 30 percent converted to the prismatic morphology.

EXAMPLE 9

SEED PHASE:

Into a 4-liter stainless steel reactor equipped with a stirrer, a gas injection tube and a liquid injection tube there was placed 1.3 liters of a 12.5 weight percent milk-of-lime (Ca(OH)$_2$) slurry. The temperature of the Ca(OH)$_2$ slurry was adjusted to 22° C. Vigorous agitation was commenced and a 20% CO$_2$, 80% air gas mixture was introduced at a rate of 7.4 liters/minute to effect carbonation of the Ca(OH)$_2$. Carbonation continued until the pH of the slurry became 8.0 indicating the reaction was substantially complete. The time of carbonation was 114 minutes and the final temperature of the seeding material was 46° C. Using electron microscopy it was determined that the resulting product was a CaCO$_3$ having a scalenohedral morphology with an AESD of 1.12 microns.

GROWTH PHASE:

The growth phase was conducted in the same stainless steel reactor as described above. The seed was agitated and 30% CO$_2$, 70% air mixture was then introduced into the reactor. The seed slurry concentration was 9% by weight. Dry CaO was added at a rate of 3 grams/minute while the CO$_2$/air gas mixture was added at a rate of 13.3 liters/minute. The rate of CaO addition was controlled to keep the slurry conductivity constant at about 2.5 mS. The growth phase continued for 59 minutes until such time as the desired amount of CaO had been added and the desired amount of growth of the seeding material obtained obtained. The final slurry temperature was 54° C. with the final slurry concentration of 17% by weight. The resulting cluster had an AESD of 2.08 microns, and via electron microscopy was determined to be about 98 percent converted to the prismatic morphology. It also had a specific surface area of 6.2 m$^2$/g.

EXAMPLE 10

Comparative Handsheet Study Example—
Preparation and Testing of Handsheets Containing Clustered Prismatic PCC Handsheets having a basic weight of 60 g/m$^2$ (40 lbs/3300 ft$^2$) were prepared using a Formax (Noble and Wood) sheet former. The pulp furnish consisted of 75% bleached hardwood and 25% bleached softwood Kraft pulps beaten to 400 CSF at pH 7.0 in distilled water. A high molecular weight, medium charge density cationic polyacrylamide (PAM) retention aid was used at a level of 0.05% (1 lb. PAM/ton of paper). An alkyl ketene dimer (AKD) synthetic sizing agent was used at a level of 0.25% (5 lbs. AKD/ton of paper). The fillers were added to the pulp furnish to achieve target filler loading levels of 15% and 25%. In addition, a handsheet containing no filler was prepared. The sheets were conditioned at 50% relative humidity and 23° C. prior to testing. The handsheets were tested for grammage, percent filler, tensile strength (breaking length), opacity (corrected to 60 g/m$^2$ basis weight), brightness, and sizing (Hercules size test—HST).

The fillers evaluated in this handsheet study include the clustered prismatic PCC products (PCC-CP) described in examples 2, 5 and 6. For comparison, a 1.4 micron scalenohedral PCC (PCC-S) and 2.0 micron prismatic PCC (PCC-P) were also evaluated. The resulting handsheet properties (breaking length, corrected opacity and sizing) are summarized in FIGS. 1–3. The results show that the clustered prismatic PCC products provide an excellent balance of strength, opacity and sizing.

The following table further illustrates the improved balance or trade-off of properties of the novel PCC particles of the subject invention, which provide the strength benefits of discrete prismatic PCC while maintaining optical properties typical of the same size scalenohedral PCC.

TABLE I

% Filler (Equivalent Tensile Strength)/Opacity Loss Data-Comparison of Various 2.0 Micron PCC Morphologies with 1.4 Micron Scalenohedral Morphology (15% Filler Level).

| PCC Morphology | % Filler, Equivalent Tensile Strength Compared to 15% PCC-S[a] | Differences in Opacity Versus 15% PCC-S[b] |
|---|---|---|
| Scalenohedral[a] | 19.3% | −0.6% |
| Discrete Prismatic[a] | 20.5% | −1.7% |
| Clustered Prismatic[a] | 20.7% | −0.6% |

[a]Average Particle Size = 2.0 microns
[b]PCC-S = Scalenohedral PCC, average particle size = 1.4 microns Another advantage of the process of this invention is that it requires virtually no cooling steps and thus represents a further cost saving when used with a satellite plant.

While the preferred embodiments of the subject invention have been described and shown, it is understood that alternatives, variables and modifications may be made thereto and come within the scope of the invention.

We claim:

1. Method for preparing precipitated calcium carbonate in the form of clusters of calcite particles, a substantial portion of said particles having a prismatic morphology, said clusters having an average equivalent spherical diameter of between about 1.5 and about 3.5 microns, and a specific surface area of between about 2.0 and about 9.0 m$^2$/g, which comprises adding lime into a reaction mixture containing seed material of scalenohedral particles having an average spherical diameter of between about 1.0 and about 1.8 microns while simultaneously introducing carbon dioxide, the flow rates of said lime and carbon dioxide being adjusted to control the solution conductivity of the reaction mixture to about 2.0 to about 4.0 mS, to form said clusters of calcite particles.

2. Method for preparing precipitated calcium carbonate in the form of clusters of calcite particles, a substantial portion of said particles having a prismatic morphology, said clusters having an average equivalent spherical diameter of between about 1.5 and about 3.5 microns, and a specific surface area of between about 2.0 and about 9.0 m$^2$/g, which comprises the steps of:

(a) forming a reaction mixture containing seed material of scalenohedral particles having an average equivalent spherical diameter of between about 1.0 and about 1.8 microns, and;

(b) adding lime into the reaction mixture while simultaneously introducing carbon dioxide, the flow rates of said lime and carbon dioxide being adjusted to control the solution conductivity of the reaction mixture to about 2.0 to about 4.0 mS, to form said clusters of calcite particles.

3. Method for preparing precipitated calcium carbonate in the form of clusters of calcite particles, a substantial proportion of said particles having a prismatic morphology, said clusters having an average equivalent spherical diameter of between about 1.5 and about 3.5 microns, and a specific surface area of between about 2.0 and about 9.0 m$^2$/g, which comprises the steps of:

(a) passing gaseous carbon dioxide through an aqueous slurry of calcium hydroxide, the introduction of said carbon dioxide being started at a temperature of between about 20° C. and about 50° C. to form a seed of particles having a scalenohedral morphology and an average equivalent spherical diameter of between about 1.0 and about 1.8 microns, and;

(b) adding further amounts of calcium hydroxide into the reaction mixture containing said seed material, while simultaneously introducing carbon dioxide into the reaction mixture, the flow rates of said additional calcium hydroxide and carbon dioxide being adjusted to control the solution conductivity of the reaction mixture to between about 2.0 and about 4.0 mS, to form said clusters of calcite particles.

4. Method in accordance with claim 3, wherein prior to step (a) the aqueous slurry is initially screened to remove unslaked lime and other impurities and in which between about 30 to about 80 percent of the screened aqueous slurry of calcium hydroxide is put into the reaction mixture of step (a).

5. Method in accordance with claim 4, wherein as part of step (a) gaseous carbon dioxide is bubbled into the screened slurry of calcium hydroxide at a controlled rate until the conductivity of the reaction mixture reaches a minimum and a pH of between 7.0 and 8.5 is reached.

6. Method in accordance with claim 3, wherein the reactions in step (a) and (b) are conducted under agitation.

7. Method in accordance with claim 4, wherein step (b) comprises, adding the balance of the screened aqueous slurry of calcium hydroxide simultaneously with a flow of gaseous carbon dioxide into the reaction mixture of step (a) which contains the seed material of scalenohedral particles, the flow rate of the added calcium hydroxide slurry and carbon dioxide being adjusted to maintain a constant solution conductivity of between about 2.0 and about 4.0 mS.

8. Method in accordance with claim 7, wherein the addition of gaseous carbon dioxide is continued until the solution conductivity reaches a minimum and a pH of between 7 and 8 is reached.

9. Method in accordance with claim 3, wherein the solution conductivity of the reaction mixture of step (b) is about 3.0 mS.

* * * * *